United States Patent

[11] 3,628,127

[72] Inventor Frederick Donald Waldhauer
Fair Haven, N.J.
[21] Appl. No. 32,050
[22] Filed Apr. 27, 1970
[45] Patented Dec. 14, 1971
[73] Assignee Bell Telephone Laboratories, Incorporated
Murray Hill, N.J.

[54] VOLTAGE LEVEL SHIFTER CIRCUIT WITH CURRENT RATIO CONTROL OF TRANSCONDUCTIVE IMPEDANCE OF SEMICONDUCTOR
8 Claims, 3 Drawing Figs.

[52] U.S. Cl. .................................................... 323/9, 307/33, 307/35, 307/237, 307/297, 323/22 T, 323/31
[51] Int. Cl. .................................................... G05f 1/56
[50] Field of Search .......................................... 323/4, 9, 22 T, 31, 35, 36, 16–22; 307/31, 33, 35, 237, 296, 297

[56] References Cited
UNITED STATES PATENTS
3,105,188 9/1963 Harrison ....................... 323/22 T
3,399,338 8/1968 Burgert et al. ................ 323/9

*Primary Examiner*—Gerald Goldberg
*Attorneys*—R. J. Guenther and E. W. Adams, Jr.

ABSTRACT: A voltage level shifter introduces a fixed voltage shift into a transmitted signal by controlling the transconductive impedance of a regulator transistor. The magnitude of the voltage shift is determined by a reference voltage drop established across an impedance energized by a constant-current source. A differentially coupled pair of transistors comprise a feedback network to compare the voltage level shift to the reference voltage and adjust the transconductive impedance of the regulator transistor accordingly. The basic voltage level shifter may be connected symmetrically in a four-terminal circuit arrangement with a common reference voltage control to generate a balanced voltage level shift free of longitudinal drift signals.

INVENTOR
F. D. WALDHAUER
BY [signature]
ATTORNEY

VOLTAGE LEVEL SHIFTER CIRCUIT WITH CURRENT RATIO CONTROL OF TRANSCONDUCTIVE IMPEDANCE OF SEMICONDUCTOR

FIELD OF THE INVENTION

This invention relates to DC voltage level shift networks which function as floating DC voltage sinks to couple networks with a precise voltage drop therebetween. Specifically, the invention related to a transistor network having operating characteristics similar to that of a zener or avalanche diode, but having the additional features of permitting adjustable voltage drops and having consistent operating characteristics.

RELATED APPLICATIONS

This invention is an improvement over a voltage level shifter disclosed by V. Saari, Ser. No. 64,323, filed Aug. 17, 1970 and assigned to the same assignee.

BACKGROUND OF THE INVENTION

In many transmission circuit applications it is desirable to shift the DC voltage level of a transmitted signal. Such applications include the coupling of DC amplifier circuit states and establishing threshold voltages to operate signal regenerators. Prior art methods of introducing a voltage level shift into a transmitted DC signal include the utilization of forward-biased diodes, avalanche diodes such as the zener diode, and regulating transistors having their transconductive impedance controlled by an impedance ratio such as a voltage divider. The use of forward-biased diodes is limited in level-shifting applications by the small magnitude of the voltage level shift attainable and the temperature dependent characteristics of diodes. The utilization of zener diodes in DC voltage level shifting applications is not satisfactory where a high degree of accuracy is required. This is due to the large variations in the operating characteristics of individual zener diodes. The application of the zener diode to level shifting is additionally limited since the zener diode has a fixed voltage drop and a high dynamic impedance. The utilization of a series-regulating transistor biased by an impedance ratio is limited as is the diode by its undesirable temperature dependent characteristics due to the temperature dependence of the base-emitter junction.

It is therefore an object of the invention to sift the level of DC voltages in a transmission circuit by a precise voltage level independently of component characteristic variations and temperature changes.

It is another object of the invention to readily permit adjustments to the voltage level shift introduced into the transmitted signal by the level shifter.

It is yet another object of the invention to reduce the dynamic impedance of voltage level shifters.

SUMMARY OF THE INVENTION

The objects of the invention are achieved by a level-shifting circuit having a variable impedance interposed between the input and output terminals which is automatically adjusted to maintain a fixed voltage shift therebetween. The variable impedance of the level-shifting circuit comprises the transconductive impedance of a regulator transistor whose collector-emitter path couples the input and the output terminals.

The magnitude of the voltage level shift is established by a reference voltage drop across a reference impedance coupled to one of the terminals and energized by a constant-current source. The transconductive paths of two differentially coupled transistors of identical characteristics couple the one terminal and the control electrode of the regulator transistor to a second constant-current source.

The control electrodes of the differentially coupled transistors are coupled to the reference impedance and to the other terminal, respectively. The ratio of the current transmitted to the second current source by the second and third transistors is responsive to the magnitudes of the reference voltage drop and the voltage level shift at the output terminal, respectively. This current ratio controls the transconductive impedance of the regulator transistor.

Due to the symmetry of the differential coupling, the voltage level at the control electrodes of the differentially coupled transistors tends to equalize. Hence when the voltage level shift departs from the value established by the reference voltage drop, the current ratio adjusts to alter the transconductive impedance of the regulator transistor to equalize the voltage level shift with the reference voltage drop.

A feature of the invention is a stabilizing arrangement to prevent wide differences in the current flow through the two differentially coupled transistors. A severe unbalance in the transconductive current flow of the differentially coupled transistors may cause one of them to turn off.

The voltage level shifter, according to the invention, accurately shifts voltage levels substantially independent of temperature variations and has the additional advantage of being adapted to be embodied in integrated circuit form with all the attendant advantages of this construction.

DESCRIPTION OF THE DRAWINGS

The foregoing and many other objects, features and advantages of the invention are readily apparent from the following detailed description of selected embodiments of the invention which are illustrated in the following drawings.

In the drawings.

DETAILED DESCRIPTION

Figure 1:
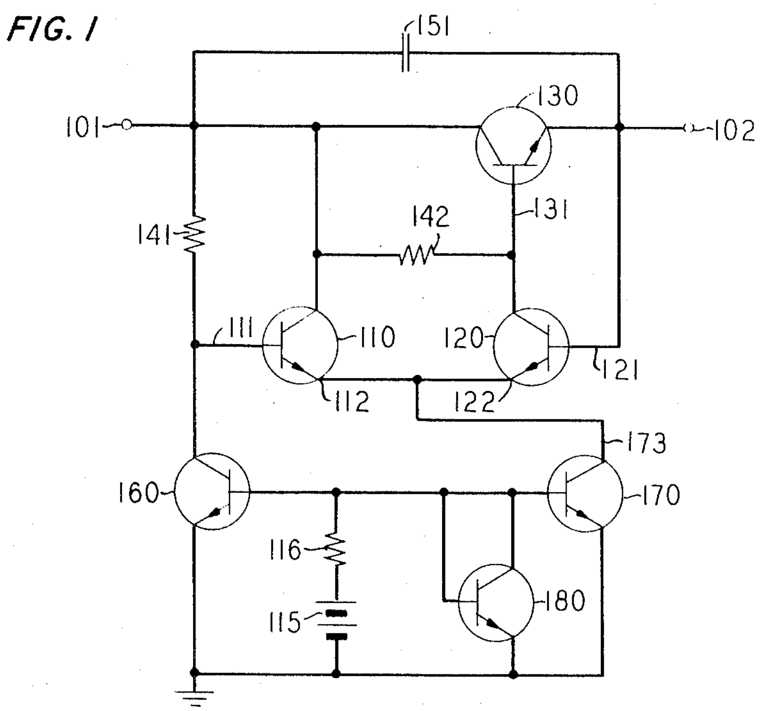
FIG. 1 is a schematic of an illustrative embodiment of a voltage level sifter according to the principles of the invention.

The voltage level shifter disclosed schematically in FIG. 1 generates a constant-voltage level shift between terminals 101 and 102 by controlling the series transconductive impedance of the regulator transistor 130.

The principles of the invention may be readily understood by describing the operation of the voltage level shifter disclosed in FIG. 1. A floating reference voltage, which determines the magnitude of the voltage level shift is derived from the voltage drop across the resistor 141. This voltage drop is developed in response to a constant current flowing therein. This constant current is established by the collector-emitter current of the transistor 160. Transistor 160 is biased by the voltage drop across the base-emitter junction of transistor 180, which is biased by a current supplied by the voltage source 115 flowing through resistor 116. Accordingly, the transistor 160 conducts a constant current. This constant current flowing through resistor 141 generates a constant reference voltage drop across the resistor 141. The resistor 141 is preferably constructed of material having temperature-independent resistance characteristics. If the resistor material used has temeprature-dependent resistance characteristics, an electrical device having complementary temperature-controlled resistance characteristics should be series connected to resistor 141 and included in the generation of the reference voltage drop.

The differentially coupled transistors 110 and 120 compare the output voltage at terminal 102 with the reference voltage drop across the resistor 141. The voltage drop across resistor 141 is applied to the base electrode 111 of transistor 110. The voltage at the output terminal 102 is applied to the base electrode 121 of the transistor 120. The emitter electrodes 112 and 122 of transistors 110 and 120 are coupled to the collector electrode 173 of transistor 170. The transistor 170 biased by the constant-voltage source 115 conducts a constant current. Inasmuch as the emitter electrodes 112 and 122 are both connected to the collector 173 of transistor 170, the sum of the currents traversing the two collector-emitter paths of transistors 110 and 120 is a constant.

It is readily apparent from the foregoing that as the voltage at the output terminal 102 varies with respect to the voltage drop across resistor 141, the relative conductivities of the transistors 110 and 120 are accordingly varied. If, for example, the voltage at the output terminal 102 rises above the voltage at the base 111, the collector-emitter path of transistor 120 conducts a greater portion of the constant current drawn by transistor 170 than does transistor 110. This added current transmitted by transistor 120 diverts the current transmitted via the resistor 142 from the base 131 of transistor 130. This reduces the conductivity of transistor 130 and increases its transconductive impedance. The increased transconductive impedance of transistor 130 increases the voltage drop across the collector-emitter terminals and reduces the voltage at output terminal 102 until it equals the voltage at base 111. It is apparent from the foregoing description that the feedback arrangement will respond to a decrease in the output voltage at terminal 102 to cause a corresponding decrease in the transconductive impedance of transistor 130.

A capacitor 151 shunts the collector-emitter path of transistor 130. This capacitor 151 operates as a high-frequency, low-impedance series path to bypass high-frequency signals.

It is apparent from the foregoing description that since the voltage level shift is determined by the voltage drop across the resistor 141, the temperature responsive characteristics of the transistor will not significantly alter the voltage level shift. The voltage level shift additionally may be readily altered by simply altering the impedance of resistor 141, or by altering the current flow through transistor 160.

Figure 2:
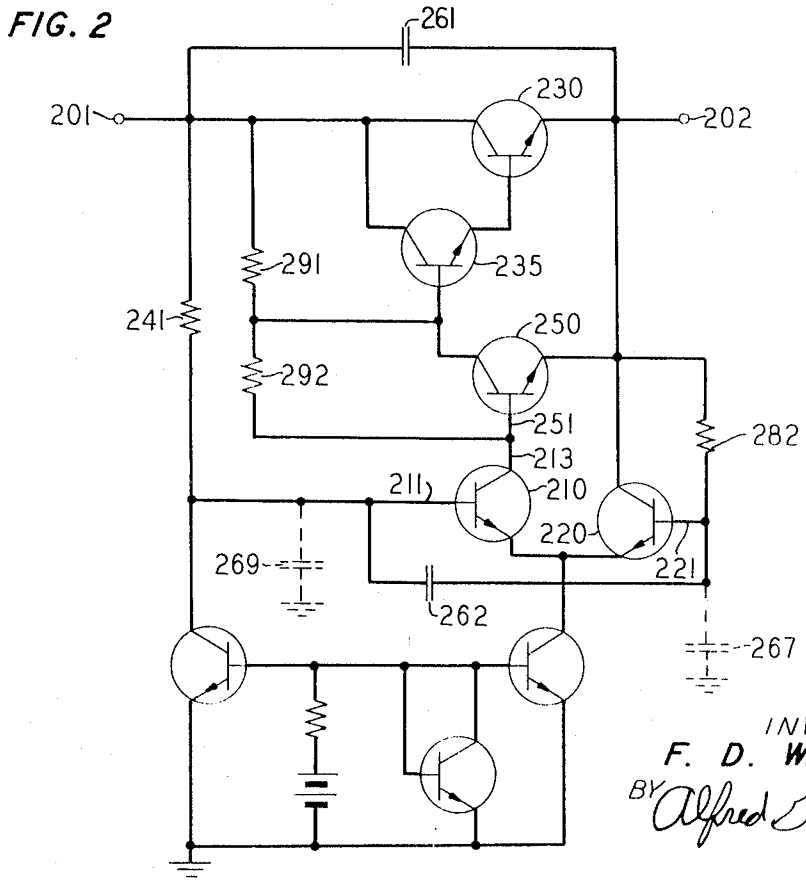
FIG. 2 is a schematic of a voltage level shifter with auxiliary circuitry to permit a wide range of voltage level shifts without unbalancing the feedback control in accordance with the principles of the invention.

A voltage level shifter permitting a wider range of adjustment in the voltage level shift is disclosed in FIG. 2. In the voltage level shifter disclosed in FIG. 1 and described above, the current flowing through the collector-emitter path of transistor 120 varies significantly with the magnitude of the voltage level shift. As the magnitude of the voltage level shift increases, the inequality of the currents flowing through transistors 110 and 120 increases to a point at which one of the differentially paired transistors turns off.

The voltage level shifter disclosed in FIG. 2 includes a current bypass to transmit the increased current due to the increased voltage level shift directly to the output terminal 202 bypassing the differentially paired transistors 210 and 220. Hence the inequality of the respective current magnitudes flowing in the differentially paired transistors 210 and 220 at high-voltage level shifts is reduced to prevent a turnoff of one of these transistors. The regulator transistors 230 and 235 are cascaded in a Darlington connection, The improved gain due to this connection reduces the dynamic impedance of the level shifter.

The level shifter of FIG. 2 is a modified to permit a larger voltage level shift by including a current bypass transmission path including the transistor 250, and the resistor 291 to transmit excess current directly to the output terminal 202. A resistor 292 shunts the collector-base junction of the transistor 250 and connects the resistor 291 to the collector 213 of transistor 210. The magnitude of the current flow through the resistors 291 and 292 is controlled by the base-emitter junction voltages of the transistors 230, 235 and 250. The current flowing to the collector 213 of transistor 210, via resistor 292, is controlled by the collector-base voltage drop of transistor 250 and hence cannot change by large amounts. At high-voltage level shifts, the resulting increased current traversing the resistor 291 is transmitted by the collector-emitter path of transistor 250 to the output terminal 202 of the level shifter. It is readily apparent that by bypassing this increased current to the output terminal 202 the currents traversing the differentially paired transistors 210 and 220 do not become significantly unbalanced causing one of the transistors to turn off.

The base electrodes 211 and 221 of the transistors 210 and 220 are coupled by a capacitor 262. This capacitor 262 is utilized to eliminate resonance between the impedance parameters of transistors 210 and 220 and the capacitor 261 which is used to bypass high-frequency signals.

The capacitors 269 and 267 connected respectively to the base electrodes 211 and 221 of transistors 210 and 220, and shown in dotted form, represent parasitic capacitances to ground. The parasitic capacitance 269 draws a current through the resistor 241 to ground. This current increases the magnitude of the voltage level shift from terminal 101 to 102. However, the parasitic capacitance 267 draws a current which produces a voltage drop of opposite polarity across the resistor 282 neutralizes the increase in magnitude of the voltage level shift produced by the current drawn by parasitic capacitor 269. It is apparent from the foregoing that the range of voltage level shifts of the level shifter is greatly increased by the addition of the current bypass transmission path. Since the basic operation of the level shifter shown in FIG. 2 is identical to that of the level shifter disclosed in FIG. 1 it is not believed necessary to further describe its operation in detail.

Figure 3:
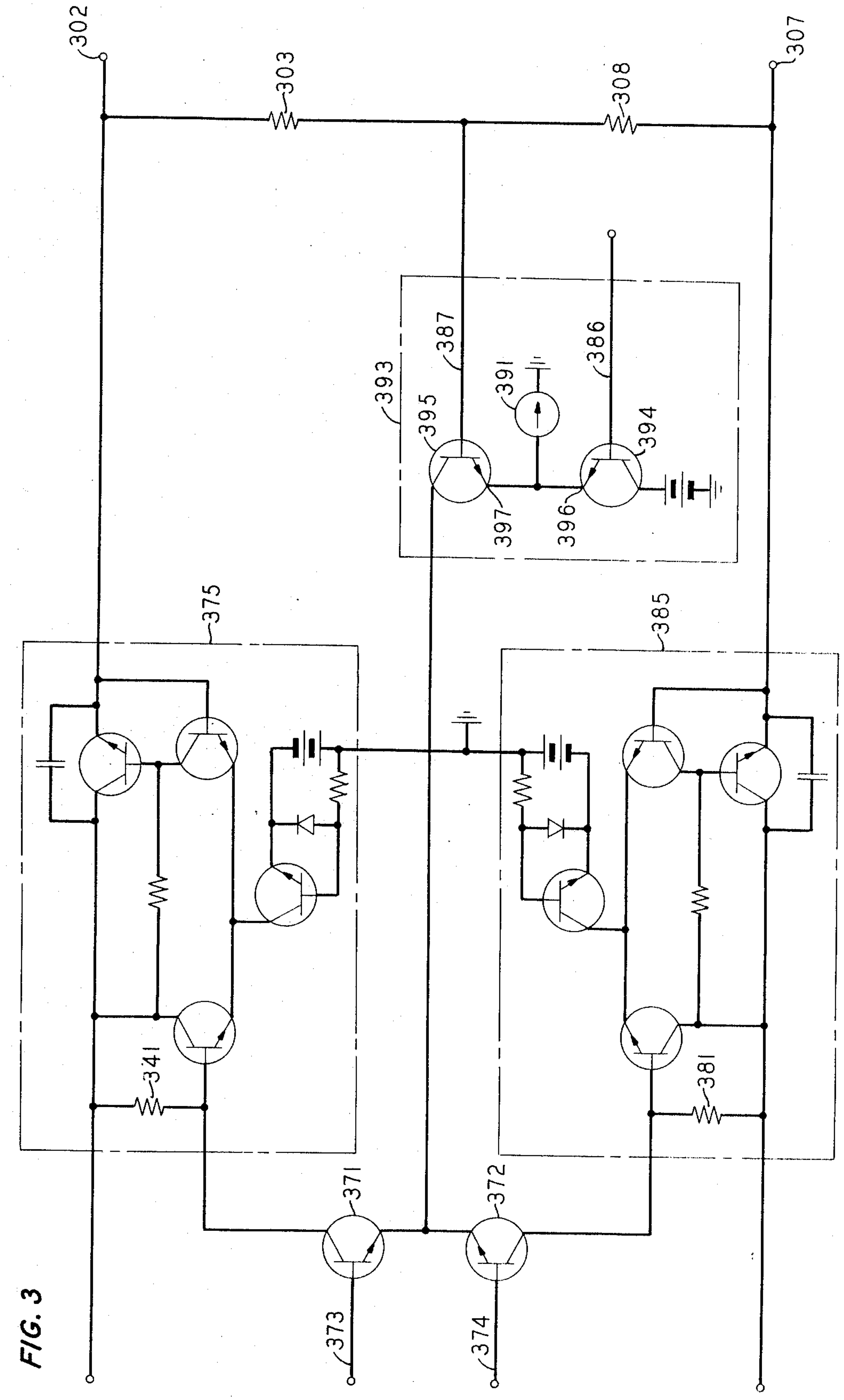
FIG. 3 is a schematic of a four-terminal balanced voltage level shifter to supply balanced longitudinal voltage level shifts.

The level-shifting arrangement disclosed in FIG. 3 comprises two level-shifting circuits as disclosed in FIG. 1 symmetrically connected in the two sides of a balanced four-terminal network arrangement. A balanced arrangement of this sort is desirable where it is necessary to protect the circuitry to which the level shift is applied from interference currents which may be generated in response to an unbalanced DC input voltage. The balanced voltage level shifter advantageously eliminates longitudinal drift signals from the shifted output voltage derived from the input voltage. As is apparent from the examination of FIG. 3 the two voltage level shifters 375 and 385 connected in the two sides of the transmission network each operate in essentially the same manner as does the voltage level shifter disclosed in FIG. 1.

The two level shifters 375 and 385 share a common constant-current source 393 which supplied the constant current to derive the reference voltage drop across the resistors 341 and 381, respectively. The common constant-current source comprises a differentially coupled pair of transistors 394 and 395 whose emitter electrodes 396 and 397 are coupled to a common current drain 391. The current flow through the collector-emitter path of transistor 395 is determined by the respective voltages at the base electrodes 386 and 387. The base 387 is coupled to the longitudinal output voltage on terminals 302 and 307, via the equal-value resistors 303 and 308. The DC voltage applied to the base 386 simultaneously controls the magnitude of the common-voltage level shift in each of the level shifters 375 and 385 by controlling the current in resistors 341 and 381, respectively.

The transistors 371 and 372 are included in the current path from the level shifters 375 and 385 to the common constant-current source 393 to permit independent adjustments to the voltage level shift attained in each of the voltage level shifters 375 and 385. These adjustment are made in order to balance the output voltage at the output terminals 302 and 307. The adjustments to achieve the controlled differences between the voltage level shifts in the level shifters 375 and 385 are controlled by the respective voltages applied to the base electrodes 373 and 374. The transconductive impedance of transistors 371 and 372 adjusts the respective currents drawn through the resistors 341 and 381 and hence the voltage level shift of the level shifters 375 and 385.

It is apparent to those skilled in the art that many variations in the above arrangement may be made to alter the polarities of the balanced output voltage by substituting semiconductor components of differing conductivity types. This balanced level-shifting arrangement is useful in providing transverse threshold voltages for applications to balances networks.

It is also apparent from the foregoing description that the level-shifting circuits may be readily constructed in the integrated circuit form so that the complete circuit may be contained on a single integrated circuit chip.

What is claimed is:

1. A voltage level shifter comprising a controllable transconductive impedance having an impedance control electrode, said transconductive impedance coupling a first terminal and a second terminal of said shifter, a floating reference voltage source, and a feedback network to compare the reference voltage with the voltage at the second terminal, said feedback network including a pair of amplifier devices having amplifier control electrodes, said amplifier devices having main transmission paths coupled to interconnect a constant-current source and the impedance control terminal of said transconductive impedance, the amplifier control electrodes of said pair of amplifier devices being coupled respectively to the reference voltage and the voltage at the second terminal, a second constant-current source, said reference voltage source comprising a reference impedance interconnecting the first terminal of said shifter and the second constant-current source, the conductivity of the transmission paths of said pair of amplifier devices reflecting the relative magnitude of the reference voltage and the voltage at the second terminal and adjusting the impedance of said transconductive impedance to adjust the voltage at the second terminal to equal the reference voltage.

2. A voltage level shifter as defined in claim 1 further including means to limit the current flow in the transmission path of at least one of said paired amplifier devices to a fixed limit, said means to limit including a current path to transmit current exceeding the fixed limit to the second terminal of said shifter.

3. A voltage level shifter as defined in claim 1 further including a second transconductive impedance coupling a third terminal to a fourth terminal and a second floating reference voltage source, said second reference voltage sources including a second reference impedance, said first and second reference impedances coupled respectively through first and second controlled impedances to said second constant-current source, said first and second controlled impedances being independently controllable to independently control the voltage level shift across said first and second transconductive impedances, respectively.

4. A voltage level shifter as defined in claim 1 wherein said transconductive impedance comprises a regulator transistor whose collector-emitter path couples the said terminals of the shifter and said pair of amplifier devices comprises a pair of emitter-coupled transistors whose collector-emitter paths couple at least one electrode of said regulator transistor to said constant current source.

5. A level-shifting circuit as defined in claim 2 further including means to compensate for variations in the voltage level shift due to the capacitance of the amplifier control electrodes of said pair of amplifier devices, said means to compensate including means to generate a voltage in response to current drawn by the capacitance of at least one of said control electrodes.

6. A level-shifting circuit for introducing a fixed voltage shift between an input and an output terminal comprising a first transistor having its transconductive path interconnecting said input and output terminal, a first and a second constant-current source, a first impedance to establish the magnitude of said voltage shift and connected to said first constant-current source, a second transistor interconnecting said input terminal to said second constant-current source and conducting current in response to the voltage drop across said first impedance, and a third transistor interconnecting the control electrode of said first transistor to said second constant-current source and conducting current in response to the voltage at said output terminal whereby the ratio of the respective current flow in said second and third transistors adjusts the conductivity level of the transconductive path of said first transistor to maintain a fixed voltage shift between said input and output terminals.

7. A level-shifting circuit as defined in claim 6 further including a fourth transistor whose transconductive path couples the input terminal to the output terminal and whose control electrode is connected to the transconductive path of said second transistor and a shunt impedance coupling the input terminal to said second transistor and connected in parallel with a junction of said fourth transistor whereby said shunt impedance limits the magnitude of current transmitted from the input terminal to said second transistor.

8. A level-shifting circuit for introducing a fixed voltage shift between an input and an output terminal comprising a first transistor having its transconductive path interconnecting said input and output terminal, a first and a second constant current source, a first impedance to establish the magnitude of said voltage shift and interconnecting said input terminal to said first constant-current source, a second transistor whose transconductive path interconnects said input terminal to said second constant current source and having its transconductive impedance responsive to the voltage drop across said first impedance, a third transistor whose transconductive path interconnects the control electrode of said first transistor to said second constant-current source and having its transconductive impedance responsive to the voltage at said output terminal and a current path including a second impedance to supply current from said input terminal to the transconductive path of said third transistor whereby the ratio of the respective current flows in the transconductive paths of said second and third transistor adjusts the conductivity level of the transconductive path of said first transistor to maintain the fixed voltage shift between said input and output terminals.

* * * * *